US012572683B2

(12) United States Patent　(10) Patent No.: US 12,572,683 B2
Wu et al.　(45) Date of Patent: Mar. 10, 2026

(54) ELECTRONIC DEVICE FOR ACCESSING DATA AND METHOD THEREOF

(71) Applicant: Wiwynn Corporation, New Taipei City (TW)

(72) Inventors: Yi-Zhe Wu, New Taipei City (TW); Chih-Yuan Lin, New Taipei City (TW); Chih-Yuan Hung, New Taipei City (TW)

(73) Assignee: Wiwynn Corporation, New Taipei City (TW)

( * ) Notice: Subject to any disclaimer, the term of this patent is extended or adjusted under 35 U.S.C. 154(b) by 78 days.

(21) Appl. No.: 18/679,436

(22) Filed: May 30, 2024

(65) Prior Publication Data

US 2024/0403467 A1　Dec. 5, 2024

Related U.S. Application Data

(60) Provisional application No. 63/470,457, filed on Jun. 2, 2023.

(51) Int. Cl.
*G06F 21/62* (2013.01)

(52) U.S. Cl.
CPC ................................ *G06F 21/6218* (2013.01)

(58) Field of Classification Search
CPC ........................... G06F 21/6218; G06F 21/572
See application file for complete search history.

(56) References Cited

U.S. PATENT DOCUMENTS

| 2019/0325139 A1* | 10/2019 | Dewan | ................. H04L 41/082 |
| 2021/0334381 A1* | 10/2021 | Zhu | ......................... G06F 21/79 |
| 2023/0046674 A1* | 2/2023 | Liu | ..................... G06F 11/1448 |

FOREIGN PATENT DOCUMENTS

| CN | 110908701 A | * | 3/2020 | ............... G06F 8/65 |
| CN | 112148336 A | | 12/2020 | |

* cited by examiner

*Primary Examiner* — Han Yang
(74) *Attorney, Agent, or Firm* — Winston Hsu

(57) ABSTRACT

An electronic device for accessing data has a first memory, a second memory and a security module. The first memory has a first region and a second region. The second memory has a third region and a fourth region. The security module maintains firmware stored in the first region, the second region, the third region and the fourth region, and generates routing decision logic depending on the firmware stored in the first region, the second region, the third region and the fourth region.

16 Claims, 6 Drawing Sheets

Memory 20a

Memory 20b

32P

Switch b-0

30b

Security module 10

321

12

12

341

Execution hardware 40

CS0 CS1

34P 34P

34P

Switch a-0 a-1

30a

320

340

20a

20b

1

| Ver. 2 | P | S |
|---|---|---|
| ACT/STG | 2 | 1 |
| REC | 0 | 0 |

| Ver. 3 | S | P |
|---|---|---|
| ACT/STG | 2 | 3 |
| REC | 0 | 0 |

| Ver. 1 | S | P |
|---|---|---|
| ACT/STG | 0 | 1 |
| REC | 0 | 0 |

| Ver. 0 | P | S |
|---|---|---|
| ACT/STG | 0 | 0 |
| REC | 0 | 0 |

| Ver. N | P | S |
|---|---|---|
| ACT/STG | N | N-1 |
| REC | 0 | 0 |

FIG. 3

ELECTRONIC DEVICE FOR ACCESSING DATA AND METHOD THEREOF

CROSS REFERENCE TO RELATED APPLICATIONS

This application claims the benefit of U.S. Provisional Application No. 63/470,457, filed on Jun. 2, 2023. The content of the application is incorporated herein by reference.

BACKGROUND OF THE INVENTION

1. Field of the Invention

The invention relates to an electronic device, and in particular, to an electronic device for accessing data and a method thereof.

2. Description of the Prior Art

Firmware embedded in hardware plays an important role in driving electronic devices to operate. Therefore, when the firmware is damaged or attacked, the electronic device may be paralyzed, and the firmware needs to be re-embedded to make the electronic device operate again. However, most electronic devices have limited hardware configuration space, and the current maintenance mechanism for firmware is insufficient to cope with emergencies of hardware or firmware failure. As a result, once the firmware cannot be accessed, the electronic device may be unable to operate.

For example, due to complex and infrequent manual server maintenance operations, if the server's firmware is damaged or attacked, or if the flash memory storing the firmware is damaged, or if other unexpected issues occur, the server may be paralyzed for an extended period because the relevant personnel may not be able to repair it promptly.

Therefore, how to flexibly utilize the hardware configuration space of an electronic device and combine it with a flexible firmware maintenance mechanism so that the electronic device can effectively access the firmware is one of the problems that needs to be solved urgently in this field.

SUMMARY OF THE INVENTION

According to an embodiment of the invention, an electronic device for accessing data includes a first memory, a second memory and a security module. The first memory includes a first region and a second region. The second memory is coupled to the first memory, and includes a third region and a fourth region. The security module is coupled to the first memory and the second memory, and is configured to maintain a firmware stored in the first region, the second region, the third region and the fourth region, and is configured to generate routing decision logic depending on the firmware stored in the first region, the second region, the third region and the fourth region.

According to an embodiment of the invention, a method for accessing data includes providing a first memory, the first memory including a first region and a second region; providing a second memory, the second memory including a third region and a fourth region; a security module maintaining a firmware stored in the first region, the second region, the third region and the fourth region; and the security module generating a routing decision logic depending on the firmware stored in the first region, the second region, the third region and the fourth region.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 shows a schematic diagram of a firmware update method in the memory module in FIG. 1.

DETAILED DESCRIPTION

Figure 1:
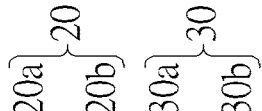
FIG. 1 shows a schematic diagram of an electronic device for accessing data according to the present invention.

The present invention is illustrated by the following embodiments. Those with ordinary knowledge in the art may easily understand the advantages and effects of the present invention after reading the content of the present invention, and may also implement or apply it through other different embodiments. Therefore, the embodiments disclosed below may be modified and/or changed to implement the invention within the scope of the disclosure, and any element or method within the scope disclosed herein may be combined with any other element or method in any embodiment described herein.

The proportions, structures, dimensions and other features presented in the drawings of the present invention are only used to illustrate the embodiments described herein, so that those with ordinary skill in the art can read and understand, and is not intended to limit the scope of the present invention. Any changes, modifications or adjustments to the above features shall fall within the scope of the technical content of the present invention without affecting the purpose and effect of the present invention.

As used herein, when an object "comprises", "includes" or "has" a particular element is described, unless otherwise stated, other elements, components, structures, regions, parts, devices, systems, steps, connections, etc. may be included instead of excluding other specific elements.

As used herein, sequential terms such as "first", "second" or "third" are only used to describe or distinguish elements, components, structures, regions, parts, devices, systems, etc., are not used to limit the scope of the present invention, nor are they used to limit the spatial order of these specific requirements. Furthermore, unless otherwise stated, the singular forms "a" and "the" used herein also include the plural form, and the terms "or" and "and/or" are used interchangeably.

FIG. 1 shows a schematic diagram of an electronic device 1 for accessing data according to the present invention. The electronic device 1 may be a server, and may include a security module 10, a memory module 20, a switch module 30 and execution hardware 40. The memory module 20 may include a memory 20a and a memory 20b. The switch module 30 may include a switch 30a and a switch 30b. Each of the above components may be installed on the motherboard of the server.

The security module 10 is coupled to the memory 20a and the memory 20b and may be implemented as a Root of Trust (ROT) circuit or an ROT chip, which is used to maintain the firmware stored in the memory 20a and the memory 20b, and is the component that is powered on with priority when the electronic device 1 is powered on. The way the security module 10 maintains the firmware includes: during the verification phase after the electronic device 1 is powered on, verifying and/or restoring the firmware stored in the memory 20a and the memory 20b; and in the running phase after passing the verification phase, the execution hardware 40 is allowed to access and execute the firmware stored in one of the memory 20a and the memory 20b, so that the electronic device 1 may function properly.

The memory 20a is coupled to the memory 20b and may be implemented as a flash memory or other memory that does not lose stored data due to power down, and is used to store the same or different versions of firmware respectively. It may ensure that the execution hardware 40 can switch to access the other one of the memory 20a and the memory 20b when one of the memory 20a and the memory 20b is not functioning properly (For example, the memory is physically damaged, the firmware is inaccessible, or verification failed), thereby reducing the likelihood of the electronic device 1 being paralyzed.

The switches 30a and 30b may be implemented as any suitable switching circuits. The switch 30a is coupled to the security module 10 and the execution hardware 40. The memory 20a and the memory 20b are coupled to the switch 30a through the security module 10, and an access path for the execution hardware 40 to electrically connect the memory 20a and/or the memory 20b is established through the switch 30a. The switch 30b is coupled to the security module 10, the memory 20a, the memory 20b and the execution hardware 40, and establishes a communication path for the memory 20a and the memory 20b to electrically connect the security module 10 or the execution hardware 40 through the switch 30b. For example, the switch 30b may switch the channel "b-0" of the switch 30b to be electrically connected to the security module 10 during the verification phase after the electronic device 1 is powered on, so as to allow the security module 10 to perform verification and/or recovery operations on the firmware stored in the memory 20a and the memory 20b through the established communication paths 321 and 32P. And during the running phase after passing the verification phase, switch the channel "b-0" of the switch 30b to be electrically connected to the execution hardware 40 to allow the execution hardware 40 to execute the firmware in the memory 20a or the memory 20b through the established communication paths 320 and 32P, so that the electronic device 1 can function properly. For another example, during the verification phase after the electronic device 1 is powered on, the switch 30a switches the channel "a-0" of the switch 30a to be electrically connected to the pin "CS0" of the execution hardware 40, and switches the channel "a-1" of the switch 30a to be electrically connected to the pin "CS1" of the execution hardware 40, so that the execution hardware 40 accesses the firmware to the memory 20a through the established access paths 34P and 340. Or switch the channel "a-1" of the switch 30a to be electrically connected to the pin "CS0" of the execution hardware 40, and switch the channel "a-0" of switch 30a to be electrically connected to the pin "CS1" of the execution hardware 40, so that the execution hardware 40 accesses the firmware to the memory 20b through the established access paths 34P and 341. The electrical connection between the above-mentioned channel "b-0" and the security module 10 or the execution hardware 40, the electrical connection between the channel "a-0" or "a-1" and the pin "CS0", and the electrical connection of channel "a-0" or "a-1" and pin "CS1" may be determined depending on the routing decision logic 12 generated by the security module 10. The switching method between the channels of the switch 30a and the pins of the execution hardware 40 will be described in detail later.

The execution hardware 40 is coupled to the memory 20a and the memory 20b, may be implemented as a Platform Controller Hub (PCH) or a Baseboard Management Controller (BMC), and is used to access, execute and update the firmware in the memory 20a or the memory 20b.

The security module 10, the memory 20a, the memory 20b, the switch 30a, the switch 30b and the execution hardware 40 may be coupled to each other through a communication interface, thereby realizing monitoring, control, data transmission and other operations between components. The communication interface may be a Serial Peripheral Interface (SPI) or other suitable communication interface.

Figure 2:
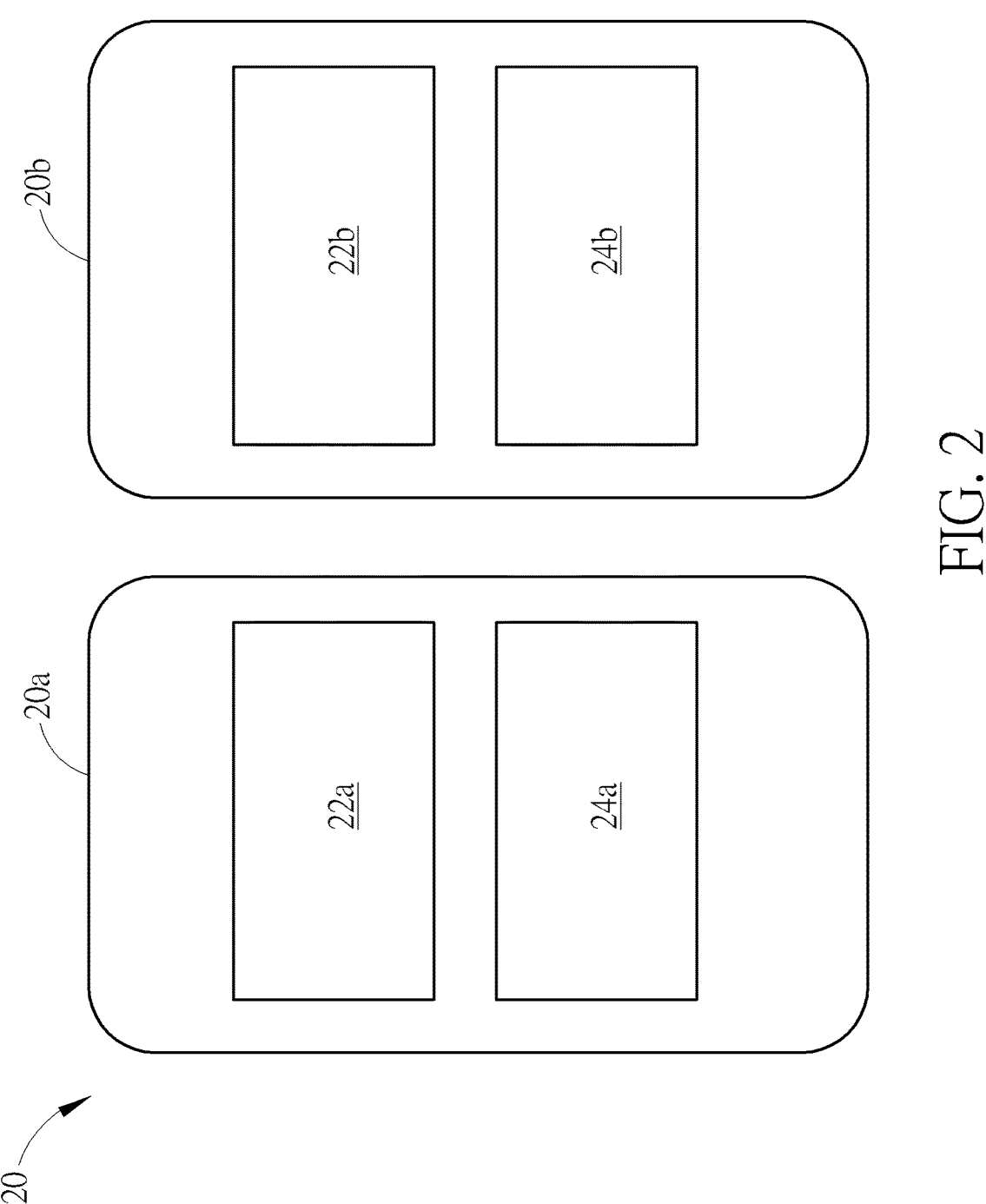
FIG. 2 shows a schematic diagram of the memory module in FIG. 1.

FIG. 2 shows a schematic diagram of the memory module 20. The memory 20a may include a region 22a and a region 24a, and the memory 20b may include a region 22b and a region 24b. The region 22a and the region 22b may serve as active/staging regions (herein referred to as "ACT/STG") of the memory 20a and the memory 20b respectively. The region 24a and the region 24b may serve as recovery regions (herein referred to as "REC") of the memory 20a and the memory 20b respectively. When both the memory 20a and the memory 20b can function properly, one of them may be set as the primary memory (herein referred to as "P"), and the other may be set as the secondary memory (herein referred to as "S"). At this time, the firmware stored in the active/staging region of the primary memory may be accessed by the execution hardware 40 and executed in the running phase, and the firmware stored in the recovery region of the primary memory and the active/staging region and recovery region of the secondary memory may be idle as a backup access solution when the firmware in the active/staging region of the primary memory fails to function properly. Furthermore, when the firmware in the active/staging region and the recovery region are both successfully verified, the firmware in the idle active/staging region may have a higher backup access priority than the firmware in the idle recovery region. Successfully verified means that the firmware meets the conditions for access. Therefore, by configuring the above-mentioned plurality of memories 20a and 20b in the electronic device 1 and storing the same or different versions of firmware in the region 22a, the region 22b, the region 24a and the region 24b, even if one of the memories is unexpectedly damaged, the firmware is inaccessible, or the firmware verification fails, the execution hardware 40 still has other backup plans for accessing the firmware. This reduces the risk of the electronic device 1 being paralyzed due to memory not functioning properly, and increases the flexibility and effectiveness of the execution hardware 40 in accessing the firmware. Moreover, the above-mentioned active/staging region configures the active region and the staging region within the same region. Compared with configuring the active region and the staging region into two independent regions, this may be achieved without using a large-capacity memory, thus allowing the electronic device 1 to utilize the hardware configuration space more flexibly.

Figure 3:
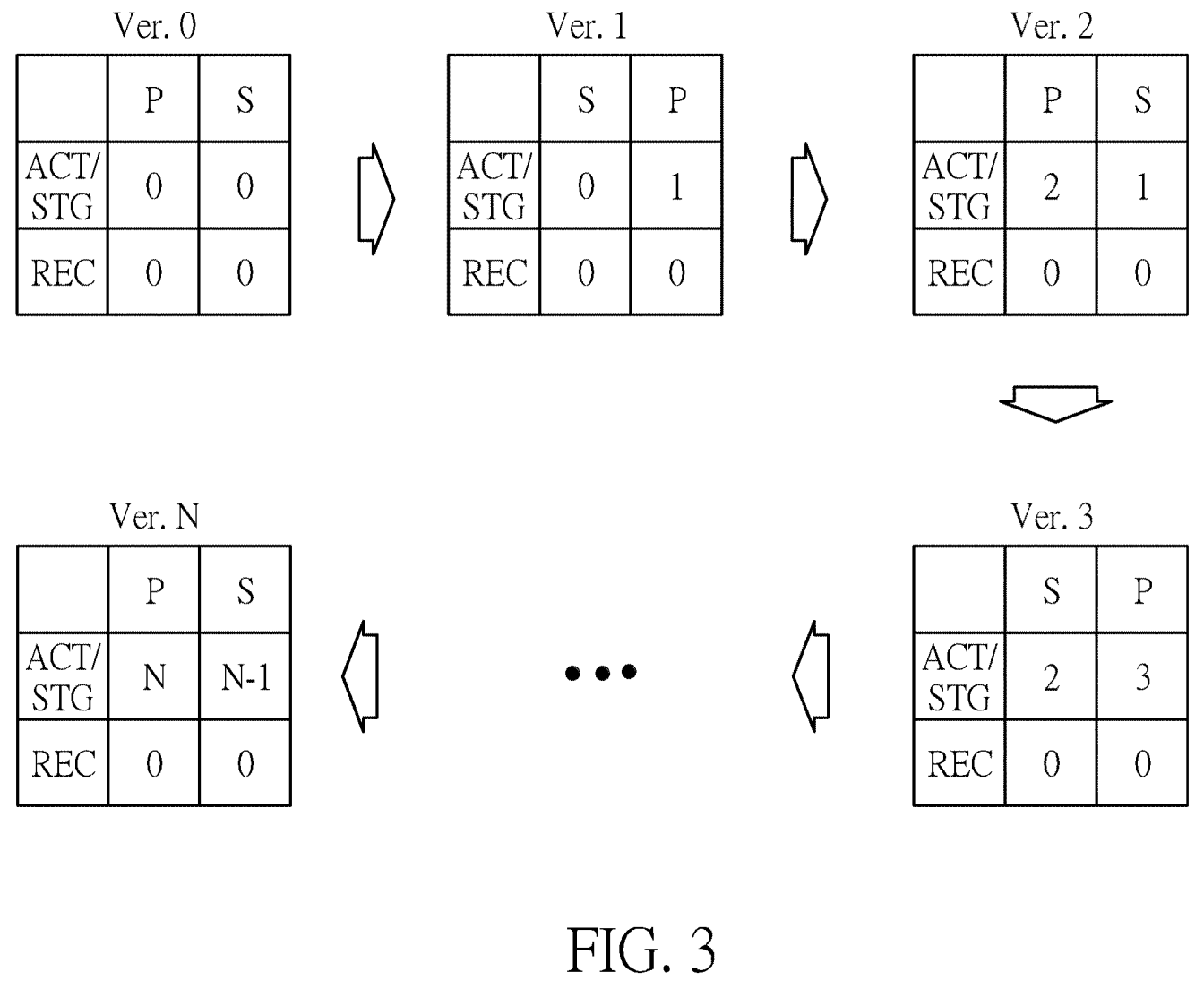

The firmware versions stored in the active/staging region and the recovery region may change depending on the status of firmware updated by the execution hardware 40. FIG. 3 shows a schematic diagram of a firmware update method in the memory module 20. Furthermore, FIG. 3 illustrates how the firmware is updated according to the locations of regions 22a, 22b, 24a and 24b shown in FIG. 2, assuming that the memory 20a and the memory 20b can function properly. Specifically, the columns marked with "P" represent the primary memory and its regions; the columns marked with "S" represent the secondary memory and its regions; the rows marked with "ACT/STG" represent the active/staging regions in the memory; and the rows marked with "REC" represent the recovery region in the memory. Furthermore, the update relationship between firmware versions here is represented by changes in integers, but the naming method of the firmware versions may be expressed in any suitable way.

The firmware update method shown in FIG. 3 is as follows: "Ver. 0" in the upper left corner indicates that when the electronic device 1 leaves the factory, all regions in the memory 20a and the memory 20b are set with a default version of firmware (for example, the initial version, herein referred to as the zeroth version), the memory 20a is set as the primary memory "P", and the memory 20b is set as the secondary memory "S" for the execution hardware 40 to access and execute the zeroth version of the firmware in the active/staging region "ACT/STG" of the primary memory "P". "Ver. 1" in the upper middle indicates that when the execution hardware 40 intends to update the firmware to the first version, the execution hardware 40 may overwrite the image of the first version of the firmware to the active/staging region "ACT/STG" of the secondary memory "S". After the electronic device 1 is power cycled, the security module 10 sets the memory 20b to be the primary memory "P" and the memory 20a to be the secondary memory "S", then performs verification, thereby allowing the execution hardware 40 to access and execute the first version of the firmware of the updated primary memory "P". "Ver. 2" in the upper right corner indicates that when the execution hardware 40 intends to update the firmware to the second version, the execution hardware 40 may overwrite the image of the second version of the firmware to the active/staging region "ACT/STG" of the secondary memory "S". After the electronic device 1 is power cycled, the security module 10 sets the memory 20a to be the primary memory "P" and the memory 20b to be the secondary memory "S", then performs verification, thereby allowing the execution hardware 40 to access and execute the second version of the firmware of the updated primary memory "P". "Ver. 3" in the lower right corner indicates that when the execution hardware 40 intends to update the firmware to the third version, the execution hardware 40 may overwrite the image of the third version of the firmware to the active/staging region "ACT/STG" of the secondary memory "S". After the electronic device 1 is power cycled, the security module 10 sets the memory 20b to be the primary memory "P" and the memory 20a to be the secondary memory "S", then performs verification, thereby allowing the execution hardware 40 to access and execute the third version of the firmware of the updated primary memory "P". The "Ver. N" in the lower left corner indicates that when the firmware is updatable to the Nth version, the execution hardware 40 and the security module 10 may perform the above operations, and then the execution hardware 40 accesses and executes the Nth version of the firmware in the active/staging region of the newly set primary memory "P" (assumed to be the memory 20a). Meanwhile, the firmware stored in the active/staging region of the newly set secondary memory "S" (assumed to be memory 20b) may be of the (N-1)th version, that is, the second latest version. In another embodiment, the security module 10 may first perform verification on the memory 20a and the memory 20b, and then set the primary and secondary memories. Furthermore, whether the execution hardware 40 needs to update the firmware version may be determined by instructions issued by users.

In short, when both memory 20a and memory 20b are functioning properly, the recovery regions (i.e., region 24a and region 24b) may be used to store a default version of firmware, and the active/staging region (i.e., region 22a or region 22b) of one of the memory 20a and memory 20b may store the latest version of firmware, and the other may store the second latest version of firmware. Furthermore, by allowing the second latest version of firmware to be directly overwritten by the updated version of firmware, the second latest version of firmware and the latest version of firmware do not affect each other because they are stored in separate memories, making the firmware update step more direct and concise.

It can also be understood from the situation shown in FIG. 3 that the execution hardware 40 may only be configured to access and execute firmware stored in the primary memory of the memory 20a and the memory 20b, and to update the firmware stored in the secondary memory of the memory 20a and the memory 20b. However, the corresponding components of the primary memory and the secondary memory are determined through the routing decision logic 12 of the security module 10. Since the security module 10 may be powered on earlier than the execution hardware 40, the way in which the security module 10 pre-generates the routing decision logic 12 for the execution hardware 40 may eliminate the additional step of confirming the location of firmware after the execution hardware 40 is powered on. The content of the routing decision logic 12 issued by the security module 10 may be exemplified by Table 1 below, and comprehended by the component connections in FIG. 1:

TABLE 1

| routing decision logic | | |
| --- | --- | --- |
| | Primary memory; secondary memory | Docking relationship |
| CSI_a | Flash_a; Flash_b | a-0 to CS0; a-1 to CS1 |
| CSI_b | Flash_b; Flash_a | a-0 to CS1; a-1 to CS0 |

The routing decision logic 12 may include different types of chip select input sets, distinguished by CSI_a or CSI_b, and are sets of decision signals sent by the security module 10 depending on the verification results of the firmware stored in the region 22a, the region 22b, the region 24a, and the region 24b, and is used to instruct the switching of the switch 30a and the pin docking relationship of the execution hardware 40. In Table 1, Flash a represents the memory 20a, and Flash_b represents the memory 20b.

As shown in Table 1, when the routing decision logic 12 includes CSI_a, it means that the security module 10 confirms that the latest version of the firmware that is successfully verified is located in the memory 20a, so the memory 20a is set as the primary memory, the channel "a-0" of the switch 30a is switched to be electrically connected to the pin "CS0" of the execution hardware 40, and the channel "a-1" of the switch 30a is switched to be electrically connected to the pin "CS1" of execution hardware 40, so that the access path of the execution hardware 40 when accessing the firmware from the primary memory includes 34P and 340, and the access path when updating the firmware to the secondary memory includes 34P and 341. And when the routing decision logic 12 includes CSI_b, it means that the security module 10 confirms that the latest version of the firmware that is successfully verified is located in the memory 20b, so the memory 20b is set as the primary memory, the channel "a-1" of the switch 30a is switched to be electrically connected to the pin "CS0" of the execution hardware 40, and the channel "a-0" of the switch 30a is switched to be electrically connected to the pin "CS1" of execution hardware 40, so that the access path of the execution hardware 40 when accessing the firmware from the primary memory includes 34P and 341, and the access path when updating the firmware to the secondary memory includes 34P and 340.

At any phase of the firmware update process shown in FIG. 3, when the latest version of the firmware is inaccessible or verification fails, the second latest version of firmware stored in the idle active/staging region "ACT/STG" may be used by the execution hardware 40 to provide the electronic device 1 with operational functionalities that are newer than the initial version. Furthermore, the firmware stored in the recovery region "REC" is retained as the default version of the firmware. The purpose is that when the firmware stored in the active/staging region "ACT/STG" of the memory 20a and the memory 20b is inaccessible or verification fails, the execution hardware 40 may access and execute the default version of firmware stored in one of the recovery regions "REC" to maintain the basic operation of the electronic device 1. Therefore, the execution hardware 40 may also include the following access methods depending on the access status of the firmware in the memory 20a and the memory 20b: When the latest version of the firmware is inaccessible or verification fails, the execution hardware 40 may switch to access and execute the second latest version of the firmware. When both the latest version and the second latest version of the firmware are inaccessible or verification fails, the execution hardware 40 may switch to access and execute the default version of the firmware. When the latest version, the second latest version and the default version of the firmware are all inaccessible or verification fails, the electronic device 1 may be paralyzed because the firmware cannot be executed. These conditions may also be determined through the content of the routing decision logic 12 issued by the security module 10, as shown in Table 2 below:

TABLE 2

| routing decision logic | | | | |
|---|---|---|---|---|
| Condition description | | | Result of setting | |
| Originally expected primary memory | Flash_a status | Flash_b status | Primary memory; secondary memory | Docking relationship |
| CSI_a | Flash_b | ACT/STG successfully verified; and/or REC successfully verified | ACT/STG is inaccessible or is accessible but verification failed | Flash_a; Flash_b | a-0 to CS0; a-1 to CS1 |
| CSI_b | Flash_a | ACT/STG is inaccessible or is accessible but | ACT/STG successfully verified; and/or REC successfully | Flash_a; Flash_b | a-0 to CS1; a-1 to CS0 |

TABLE 2-continued

| routing decision logic | | | | |
|---|---|---|---|---|
| Condition description | | | Result of setting | |
| Originally expected primary memory | Flash_a status | Flash_b status | Primary memory; secondary memory | Docking relationship |
| | verification failed | verified | | |

The same symbols in Table 2 as those in Table 1 represent the same components, and Table 2 shows, in addition to the conditions listed in Table 1, the operation of each component in FIG. 1 when one of the memory 20a and the memory 20b is used as the primary memory and is not functioning properly.

As shown in Table 2, when the routing decision logic 12 includes CSI_a, it may also mean that the security module 10 confirms that the firmware in the active/staging region of the memory 20b originally expected to be the primary memory is inaccessible or accessible but verification failed, and the firmware of at least one of the active/staging region and the recovery region in the memory 20a is successfully verified, so the memory 20a is set as the primary memory, the channel "a-0" of the switch 30a is switched to be electrically connected to the pin "CS0" of the execution hardware 40, and the channel "a-1" of the switch 30a is switched to be electrically connected to the pin "CS1" of execution hardware 40, so that the access path of the execution hardware 40 when accessing the firmware from the primary memory includes 34P and 340, and the security module 10 performs the recovery of the firmware in the active/staging region of the memory 20b. When the routing decision logic 12 includes CSI_b, it may also mean that the security module 10 confirms that the firmware in the active/staging region of the memory 20a originally expected to be the primary memory is inaccessible or accessible but verification failed, and the firmware of at least one of the active/staging region and the recovery region in the memory 20b is successfully verified, so the memory 20b is set as the primary memory, the channel "a-1" of the switch 30a is switched to be electrically connected to the pin "CS0" of the execution hardware 40, and the channel "a-0" of the switch 30a is switched to be electrically connected to the pin "CS1" of execution hardware 40, so that the access path of the execution hardware 40 when accessing the firmware from the primary memory includes 34P and 341, and the security module 10 performs the recovery of the firmware in the active/staging region of the memory 20a. In other words, the security module 10 may be used to maintain the firmware stored in the region 22a, the region 22b, the region 24a, and the region 24b, and generate the routing decision logic 12 depending on the firmware stored in the region 22a, the region 22b, the region 24a, and the region 24b.

Of course, the way the security module 10 sets the chip select input set in the routing decision logic 12 may further include more detailed considerations than those listed in Table 1 and Table 2, which may be explained in FIGS. 4 to 6 below.

Figure 4:
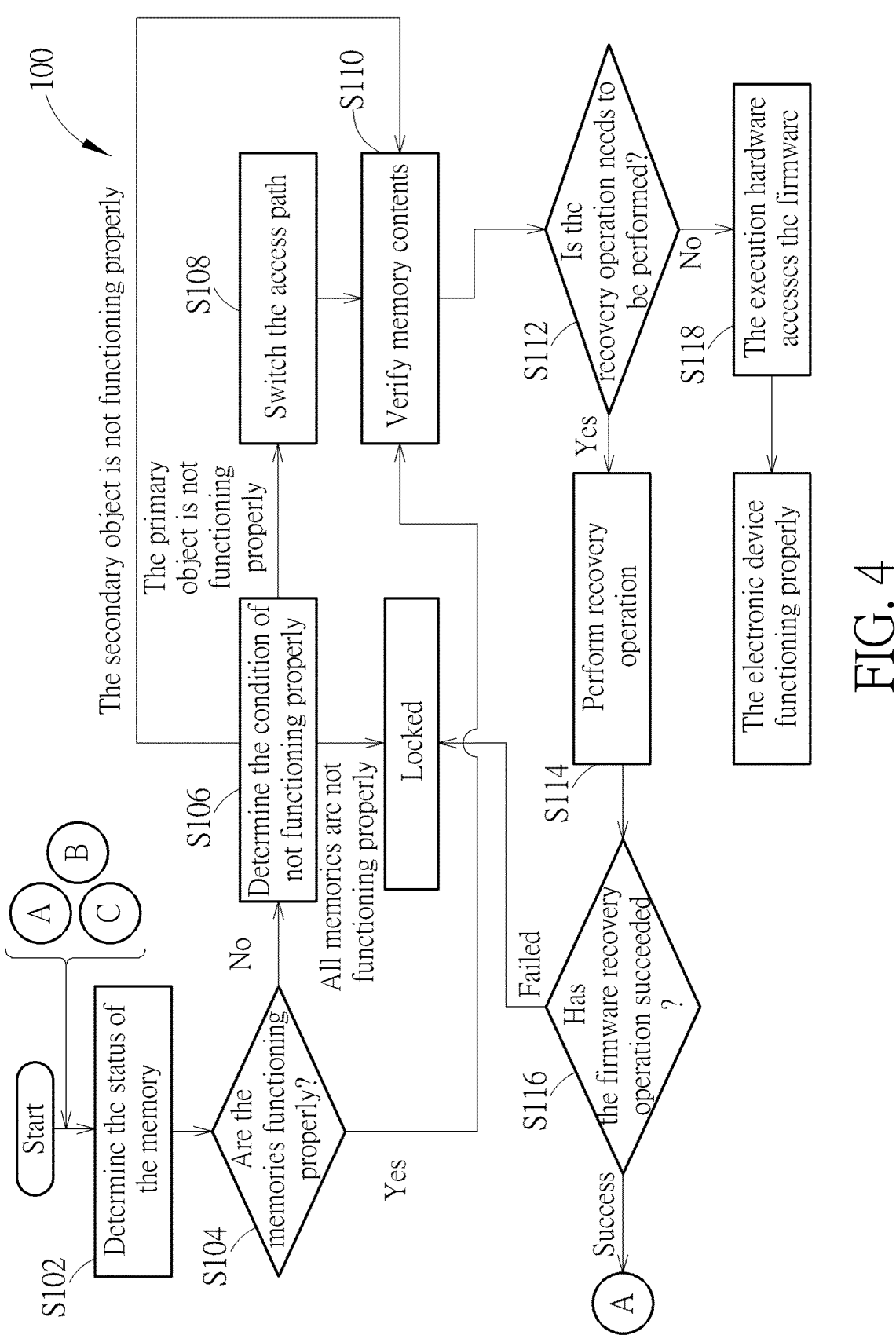
FIG. 4 shows a flow chart of the method for accessing data according to the present invention.

FIG. 4 shows a flow chart of the method 100 for accessing data according to the present invention. Furthermore, FIG. 4 illustrates the method 100 for accessing data of the security module 10 to determine the routing decision logic 12 and/or perform firmware recovery after the electronic device 1 is powered on. The method 100 for accessing data of the security module 10 is executed in the verification phase and the running phase after the electronic device 1 is powered on, and may include the following steps:

S102: The security module 10 determines the status of the memory 20a and the memory 20b, including confirming which memory the latest version of the firmware is stored in, and verifying the firmware of each of the region 22a, the region 22b, the region 24a, and the region 24b, thereby initially determining the content of the routing decision logic 12 to be sent to the switch 30a, such as CSI_a or CSI_b shown in the aforementioned Tables 1 and 2;

S104: The security module 10 determines whether the memory 20a and the memory 20b are functioning properly. Furthermore, if the memories are functioning properly, go to step S110; if the memories are not functioning properly, go to step S106;

S106: The security module 10 determines whether the primary memory needs to be replaced depending on the not functioning properly of the memory 20a and the memory 20b. For example, if it is determined only the secondary memory is not functioning properly, since it does not affect the execution hardware 40's access to firmware stored in the primary memory, the original content of the routing decision logic 12 is retained and go to step S110; if it is determined only the primary memory is not functioning properly, the access path for the execution hardware 40 to access the firmware should be switched to the properly functioning secondary memory, so go to step S108; and if it is determined all memories are not functioning properly, it is confirmed that the electronic device 1 does not have firmware to support proper functioning, so the electronic device 1 may be locked;

S108: The security module 10 exchanges the primary memory and the secondary memory set by the initially determined routing decision logic 12, transmits the modified routing decision logic 12 content to the switch 30a, and causes the switch 30a to switch the access path for the execution hardware 40 to access the firmware;

S110: The security module 10 performs a firmware verification operation after the electronic device 1 is powered on, and the verification operation may be executed one by one on the firmware of each region 22a, region 22b, region 24a, and region 24b. At this time, if it is determined in steps S106 and S108 that one of the memories is not functioning properly, the verification operation in step S110 only needs to be executed on the memory that is functioning properly;

S112: The security module 10 determines whether a recovery operation needs to be performed depending on the verification results of the firmware of the region 22a, the region 22b, the region 24a, and the region 24b; if so, go to step S114; if not, go to step S118;

S114: The security module 10 performs recovery operations on the firmware with failed verification, including overwriting the firmware that fails verification in the region 22a, the region 22b, the region 24a and the region 24b with the successfully verified firmware, correcting the content of the routing decision logic 12 depending on the firmware recovery status and/or power cycling the electronic device 1 to complete the recovery operation, etc.;

S116: The security module 10 determines whether the firmware recovery operation has been successful: If "failed" indicates that the electronic device 1 does not have firmware to support proper functioning, so the electronic device 1 may be locked; if "success" indicates that the firmware of the electronic device 1 has been restored to a level that can support proper functioning, the process may return to step S102 from node A to complete the proper functioning of the electronic device 1;

S118: The security module 10 determines that the firmware of regions 22a, 22b, 24a, and 24b are all successfully verified, and no recovery operation is required, so the final determined routing decision logic 12 may be sent to the switch 30a to establish an access path for the execution hardware 40 to access the firmware, thereby allowing the electronic device 1 to enter the running phase, allowing the execution hardware 40 to access and execute the firmware. In this way, the electronic device 1 may function properly.

The recovery operation described in steps S112 to S118 refers to overwriting the firmware that failed verification with the firmware that is successfully verified, and may be performed depending on the following two rules: (1) When the latest version of the firmware in the active/staging region of the primary memory is inaccessible or verification fails, and the second latest version of the firmware in the active/staging region of the secondary memory is successfully verified, the latest version of the firmware may be overwritten with the second latest version of the firmware. (2) When both the latest version of the firmware and the second latest version of the firmware in the active/staging region are inaccessible or both verifications fail, and the default version of firmware in any recovery region is successfully verified, the latest version of firmware may be overwritten with the default version of firmware. The execution status of these two rules may be further subdivided into the events listed in Table 3 and Table 4 below. Table 3 shows the firmware recovery strategy when the memory 20a and memory 20b are not physically damaged. Table 4 shows the firmware recovery strategy when one of the memory 20a and memory 20b is physically damaged, and the other one that is not physically damaged may be set as the primary memory.

Table 3 lists 16 events and corresponding firmware recovery strategies from top to bottom depending on the firmware verification results. Y represents that the firmware verification of the corresponding region is successful, N represents that the firmware of the corresponding region is inaccessible or verification fails, and event 1 represents the worst situation:

TABLE 3

| | firmware recovery strategies | | | | |
|---|---|---|---|---|---|
| | Primary memory (P) | | Secondary memory (S) | | Firmware recovery |
| Event | ACT/STG | REC | ACT/STG | REC | strategies |
| 1 | N | N | N | N | All firmware is inaccessible or verification fails and the system is locked. |
| 2 | N | N | N | Y | Overwrite the REC content of S to the ACT/STG of S, swap P and S, power cycle and go to event 13. |
| 3 | N | N | Y | N | Swap P and S and go to event 9. |
| 4 | N | N | Y | Y | Swap P and S and go to event 13. |

TABLE 3-continued

| | firmware recovery strategies | | | | |
|---|---|---|---|---|---|
| | Primary memory (P) | | Secondary memory (S) | | Firmware recovery |
| Event | ACT/STG | REC | ACT/STG | REC | strategies |
| 5 | N | Y | N | N | Overwrite the REC content of P to the ACT/STG of P and go to event 13. |
| 6 | N | Y | N | Y | Overwrite the REC content of P to the ACT/STG of P, overwrite the REC content of S to the ACT/STG of S, and go to event 16. |
| 7 | N | Y | Y | N | Swap P and S and go to event 10. |
| 8 | N | Y | Y | Y | Swap P and S and go to event 14. |
| 9 | Y | N | N | N | Overwrite the ACT/STG content of P to the ACT/STG of S, power cycle and go to event 11 |
| 10 | Y | N | N | Y | Overwrite the REC content of S to the REC of P and go to event 14 |
| 11 | Y | N | Y | N | No recovery is required, but an alert is required. |
| 12 | Y | N | Y | Y | Overwrite the REC content of S to the REC of P. |
| 13 | Y | Y | N | N | Overwrite the REC contents of P to the REC of S and go to event 14. |
| 14 | Y | Y | N | Y | Overwrite the ACT/STG content of P to the ACT/STG of S. |
| 15 | Y | Y | Y | N | Overwrite the REC content of P to the REC of S. |
| 16 | Y | Y | Y | Y | No recovery is required. |

Table 4 lists 4 events and corresponding firmware recovery strategies from top to bottom depending on the firmware verification results. Y represents that the firmware verification of the corresponding region is successful, N represents that the firmware of the corresponding region is inaccessible or verification fails, and event 1 represents the worst situation:

TABLE 4

| | firmware recovery strategies | | | | |
|---|---|---|---|---|---|
| | Primary memory (P) | | Secondary memory (S) | | Firmware recovery |
| Event | ACT/STG | REC | ACT/STG | REC | strategies |
| 1 | N | N | damaged | damaged | All firmware is inaccessible or verification fails and the system is locked. |
| 2 | N | Y | damaged | damaged | Overwrite the REC content of P to the ACT/STG of P. |
| 3 | Y | N | damaged | damaged | No recovery is required, but an alert is required. |
| 4 | Y | Y | damaged | damaged | No recovery is required. |

As shown in FIG. 4, Table 3 and Table 4, the operating logic of the firmware recovery operation is as follows: The firmware stored in the idle active/staging region has a higher backup access priority; and only when the firmware in both active/staging regions is inaccessible or verification fails, the firmware in the recovery region may be executed by the hardware 40 as a backup. Furthermore, when neither the memory 20*a* nor the memory 20*b* is physically damaged, the firmware in the active/staging region may restore (overwrite) each other, and the firmware in the recovery region may also restore (overwrite) each other.

Figure 5:
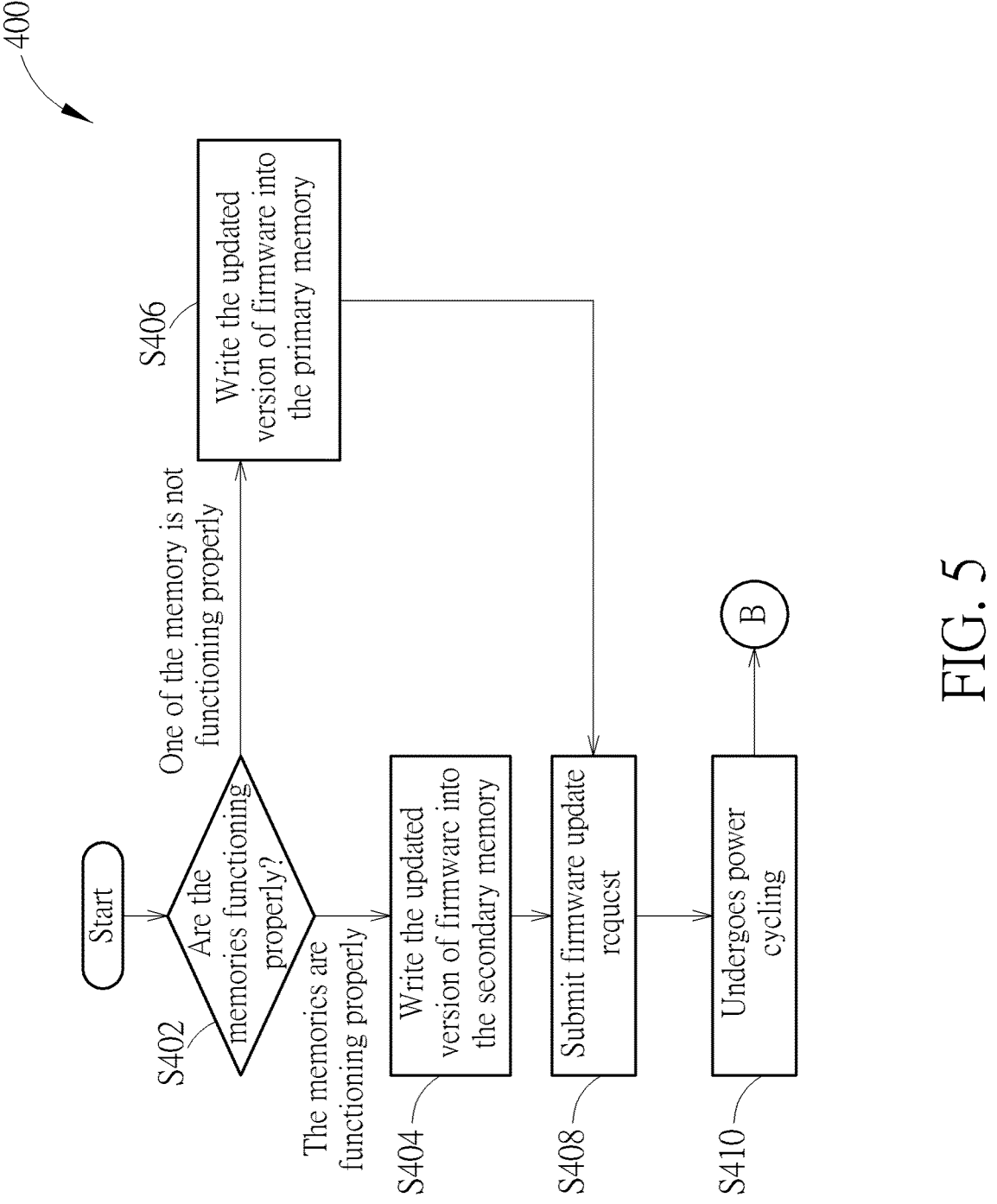
FIG. 5 shows a flow chart of a firmware update method according to the present invention.
Figure 6:
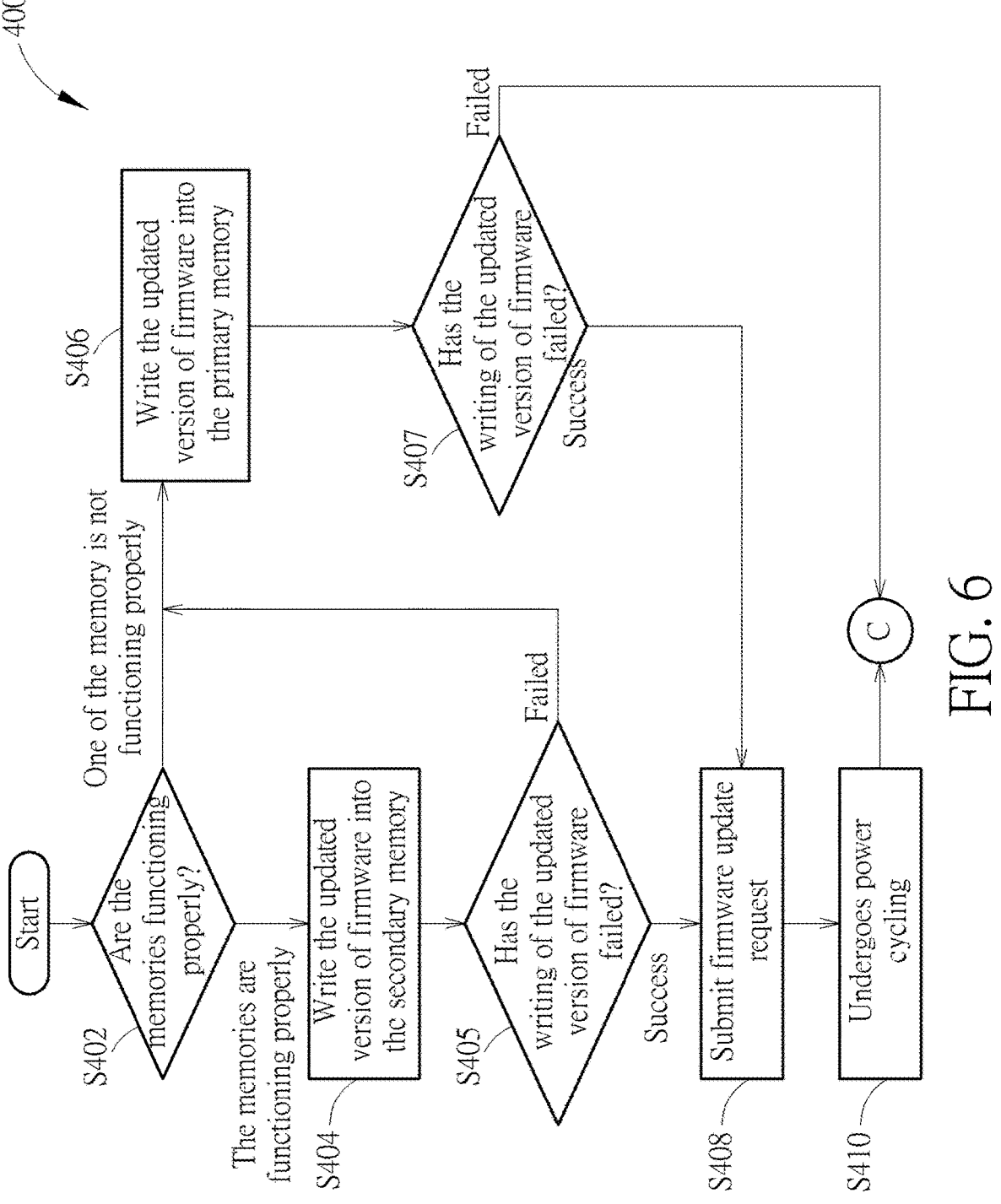
FIG. 6 shows a flow chart of another firmware update method according to the present invention.

FIGS. 5 and 6 shows the flow charts of the execution hardware 40 executing the firmware update method 400 or 400' in the running phase after the electronic device 1 is powered on depending on the result of the security module 10 performing the method 100 for accessing data in FIG. 4. The differences between the firmware update methods 400 and 400' is that the firmware update method 400' adds optional steps S405 and S407, and the details are as follows:

S402: The execution hardware 40 determines whether one of the memory 20*a* and the memory 20*b* is functioning properly; if one of them is not functioning properly, go to step S406; otherwise go to step S404;

S404: The execution hardware 40 writes the updated version of the firmware into the active/staging region of the secondary memory depending on the access path established by the switch 30*a*. Then, in FIG. 5, go to step S408, and in FIG. 6, go to step S405;

S405: The execute hardware 40 determines whether the writing of the updated version of the firmware has failed; if failed, go to step S406; if successful, go to step S408;

S406: The execution hardware 40 determines that one of the memory 20*a* and the memory 20*b* is not functioning properly, so the execution hardware 40 writes the updated version of the firmware into the active/staging region of the primary memory instead. Then, in FIG. 5, go to step S408, and in FIG. 6, go to step S407;

S407: The execute hardware 40 determines whether the writing of the updated version of the firmware has failed; if failed, return to method 100 through node C; if successful, go to step S408;

S408: After the writing of the updated version of firmware is completed, the execution hardware 40 submits a firmware update request to the security module 10 and go to step S410;

S410: Since the updated version of the firmware needs to be executed by the hardware 40 after the electronic device 1 undergoes power cycling, the update is considered complete. Therefore, the execution hardware 40 may require the electronic device 1 to undergo power cycling, thereby returning to the method 100 through node B or C to complete the firmware update.

In addition to the above, other variations of the embodiments of the present invention may include the following: The default version of firmware stored in the recovery regions of memory 20*a* and memory 20*b* does not need to retain the initial 0th version, for example, may be overwritten with the same or older version of the firmware with each firmware update. The memory module 20 may also include additional memories besides the memory 20*a* and the memory 20*b*, and may be used to store the same or different versions of firmware as those in the memory 20*a* and the memory 20*b*, thereby expanding the options for backup access of the firmware. Alternatively, each of the memory 20*a* and the memory 20*b* may also be planned to have two or more active/staging regions and recovery regions to further increase the flexibility of the internal space configuration of the memory.

In summary, the electronic device and method for accessing data disclosed in the present invention may realize multiple backup access plans of the firmware by organizing multiple regions of the memory, not only can the hardware space of the electronic device be configured more flexibly, but also a security module can be set up to maintain the firmware, combined with the switch to pre-establish an access path for the executing hardware to access the firmware, a flexible firmware maintenance mechanism may be realized, avoiding the additional burden of confirming the location of the firmware after the execution hardware powers on, thereby enabling the electronic device to effectively access the firmware, and reducing the likelihood of the electronic device being paralyzed and maintaining proper functioning.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device for accessing data comprising:
a first memory comprising a first region and a second region;
a second memory coupled to the first memory, comprising a third region and a fourth region;
a security module coupled to the first memory and the second memory, and configured to maintain a firmware stored in the first region, the second region, the third region and the fourth region, and generate a routing decision logic depending on the firmware stored in the first region, the second region, the third region and the fourth region;
a switch coupled to the security module, and configured to establish a first access path and/or a second access path to the firmware depending on the routing decision logic; and
an execution hardware coupled to the switch, the first memory and the second memory, and configured to access the firmware stored in a primary memory of the first memory and the second memory through the first access path, and/or to update the firmware stored in a secondary memory of the first memory and the second memory through the second access path;
wherein when the routing decision logic comprises a first chip select input set, the first memory is set as the primary memory, and the second memory is set as the secondary memory; or
when the routing decision logic comprises a second chip select input set, the second memory is set as the primary memory, and the first memory is set as the secondary memory.

2. The electronic device of claim 1, wherein:
one of the first region and the third region stores a latest version of the firmware, and the other one stores a second latest version of the firmware.

3. The electronic device of claim 2, wherein:
when the latest version of the firmware is inaccessible or verification fails, and the second latest version of the firmware is successfully verified, the security module overwrites the latest version of the firmware with the second latest version of the firmware.

4. The electronic device of claim 2, wherein:
the second region and the fourth region respectively store a default version of the firmware, and the default version of the firmware is the same as or older than the latest version of the firmware; and
when both the latest version and the second latest version of the firmware are inaccessible or verification fails, and the default version of the firmware is successfully verified, the security module overwrites the latest version of the firmware with the default version of the firmware.

5. The electronic device of claim 1, wherein the execution hardware is a platform controller hub or a baseboard management controller.

6. The electronic device of claim 1, wherein:
when the first memory is successfully verified and the first region stores the latest version of the firmware, the routing decision logic comprises the first chip select input set; and
the execution hardware is configured to update the firmware stored in the third region.

7. The electronic device of claim 1, wherein:
when the second memory is successfully verified and the third region stores the latest version of the firmware, the routing decision logic comprises the second chip select input set; and
the execution hardware is configured to update the firmware stored in the first region.

8. The electronic device of claim 1, wherein:
when the second memory is inaccessible or verification fails, and the first memory is successfully verified, the routing decision logic comprises the first chip select input set; or
when the first memory is inaccessible or verification fails, and the second memory is successfully verified, the routing decision logic comprises the second chip select input set.

9. A method for accessing data comprising:
providing a first memory, the first memory comprising a first region and a second region;
providing a second memory, the second memory comprising a third region and a fourth region;
a security module maintaining a firmware stored in the first region, the second region, the third region and the fourth region;
the security module generating a routing decision logic depending on the firmware stored in the first region, the second region, the third region and the fourth region;
a switch establishing a first access path and/or a second access path to the firmware depending on the routing decision logic; and
an execution hardware accessing the firmware stored in a primary memory of the first memory and the second memory through the first access path, and/or updating the firmware stored in a secondary memory of the first memory and the second memory through the second access path;
wherein the method further comprises:
when the routing decision logic comprises a first chip select input set, setting the first memory as the primary memory and setting the second memory as the secondary memory; or
when the routing decision logic comprises a second chip select input set, setting the second memory as the primary memory and setting the first memory as the secondary memory.

10. The method of claim 9, further comprising:
storing a latest version of the firmware in one of the first region and the third region; and
storing a second latest version of the firmware in the other one of the first region and the third region.

11. The method of claim 10, further comprising:
when the latest version of the firmware is inaccessible or verification fails, and the second latest version of the firmware is successfully verified, the security module overwriting the latest version of the firmware with the second latest version of the firmware.

12. The method of claim 10, further comprising:

storing a default version of the firmware in the second region and the fourth region, and the default version of the firmware being the same as or older than the latest version of the firmware; and when both the latest version and the second latest version of the firmware are inaccessible or verification fails, and the default version of the firmware is successfully verified, the security module overwriting the latest version of the firmware with the default version of the firmware.

13. The method of claim 9, wherein:

the execution hardware is a platform controller hub or a baseboard management controller.

14. The method of claim 9, wherein:

when the first memory is successfully verified and the first region stores the latest version of the firmware, the routing decision logic comprises the first chip select input set; and the method further comprises the execution hardware updating the firmware stored in the third region.

15. The method of claim 9, wherein:

when the second memory is successfully verified and the third region stores the latest version of the firmware, the routing decision logic comprises the second chip select input set; and the method further comprises the execution hardware updating the firmware stored in the first region.

16. The method of claim 9, wherein:

when the second memory is inaccessible or verification fails, and the first memory is successfully verified, the routing decision logic comprises the first chip select input set; or when the first memory is inaccessible or verification fails, and the second memory is successfully verified, the routing decision logic comprises the second chip select input set.

*    *    *    *    *